US012584784B2

(12) United States Patent
Oda

(10) Patent No.: US 12,584,784 B2
(45) Date of Patent: Mar. 24, 2026

(54) ELECTRONIC BALANCE AND METHOD FOR STABILIZING WEIGHING ACCURACY BY ELECTRONIC BALANCE

(71) Applicant: A&D COMPANY, LIMITED, Tokyo (JP)

(72) Inventor: Hisanori Oda, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 391 days.

(21) Appl. No.: 18/269,467

(22) PCT Filed: Dec. 25, 2020

(86) PCT No.: PCT/JP2020/048692
§ 371 (c)(1),
(2) Date: Jun. 23, 2023

(87) PCT Pub. No.: WO2022/137500
PCT Pub. Date: Jun. 30, 2022

(65) Prior Publication Data
US 2024/0094049 A1 Mar. 21, 2024

(51) Int. Cl.
*G01G 23/16* (2006.01)
*G01G 13/02* (2006.01)
*G01G 21/28* (2006.01)

(52) U.S. Cl.
CPC ............. *G01G 23/16* (2013.01); *G01G 13/02* (2013.01); *G01G 21/286* (2013.01)

(58) Field of Classification Search
CPC ...... G01G 13/02; G01G 21/286; G01G 23/01; G01G 23/16
See application file for complete search history.

(56) References Cited

U.S. PATENT DOCUMENTS

| | | | |
|---|---|---|---|
| 4,932,487 A | 6/1990 | Melcher et al. | |
| 5,056,050 A | 10/1991 | Fuchs et al. | |
| 8,203,086 B2 | 6/2012 | Izumo et al. | |
| 9,354,109 B2 * | 5/2016 | Izumo .................... | G01G 23/01 |
| 9,612,149 B2 * | 4/2017 | Burkhard ............. | G01G 19/414 |

(Continued)

FOREIGN PATENT DOCUMENTS

| | | |
|---|---|---|
| JP | S62-280624 A | 12/1987 |
| JP | H07-023239 U | 4/1995 |

(Continued)

*Primary Examiner* — Natalie Huls

(74) *Attorney, Agent, or Firm* — Studebaker Brackett PLLC

(57) ABSTRACT

The electronic balance is configured to be capable of performing the following series of operations (I) to (VII) automatically: (I) The opening and closing mechanism opens the door. (II) The moving up/down mechanism applies the load of the built-in weight to the weighing mechanism. (III) The opening and closing mechanism closes the door. (IV) After a predetermined period of time elapses, the opening and closing mechanism opens the door. (V) The moving up/down mechanism removes the load of the built-in weight from the weighing mechanism. (VI) The opening and closing mechanism closes the door. (VII) The control unit performs zero-point adjustment of the weighed value. Accordingly, operation of preliminary loading is automatically performed, and thus the stability of the weighing accuracy is improved.

11 Claims, 9 Drawing Sheets

(56)  References Cited

U.S. PATENT DOCUMENTS

| | | | | |
|---|---|---|---|---|
| 11,054,300 | B2 * | 7/2021 | Zehnder | G01G 21/22 |
| 11,175,176 | B2 * | 11/2021 | Oda | G01G 23/00 |
| 11,473,966 | B2 * | 10/2022 | Oda | E05F 15/56 |
| 11,703,375 | B2 * | 7/2023 | Reiners | G01G 21/244 |
| | | | | 177/50 |
| 12,140,471 | B2 * | 11/2024 | Oda | G01G 21/286 |
| 12,146,783 | B2 * | 11/2024 | Oda | G01G 21/286 |
| 2006/0021803 | A1 * | 2/2006 | Iiduka | G01G 21/286 |
| | | | | 177/180 |
| 2007/0010960 | A1 * | 1/2007 | Tellenbach | G01G 23/01 |
| | | | | 702/105 |
| 2009/0020341 | A1 * | 1/2009 | Hamamoto | G01G 23/48 |
| | | | | 177/180 |
| 2013/0068542 | A1 | 3/2013 | Izumo et al. | |
| 2013/0319072 | A1 * | 12/2013 | Laubstein | G01G 23/01 |
| | | | | 73/1.13 |
| 2016/0250628 | A1 | 9/2016 | Graf et al. | |
| 2019/0316955 | A1 * | 10/2019 | Buchmann | G01G 21/23 |
| 2021/0156731 | A1 | 5/2021 | Oda | |
| 2024/0060816 | A1 | 2/2024 | Okabe et al. | |
| 2024/0094048 | A1 | 3/2024 | Okabe et al. | |

FOREIGN PATENT DOCUMENTS

| | | | |
|---|---|---|---|
| JP | 2001-133317 | A | 5/2001 |
| JP | 2007-212254 | A | 8/2007 |
| JP | 2012-002677 | A | 1/2012 |
| JP | 2012-007970 | A | 1/2012 |
| JP | 4851882 | B2 | 1/2012 |
| JP | 5062880 | B2 | 10/2012 |
| WO | 2006/082915 | A1 | 8/2006 |
| WO | 2020/129190 | A1 | 6/2020 |

* cited by examiner

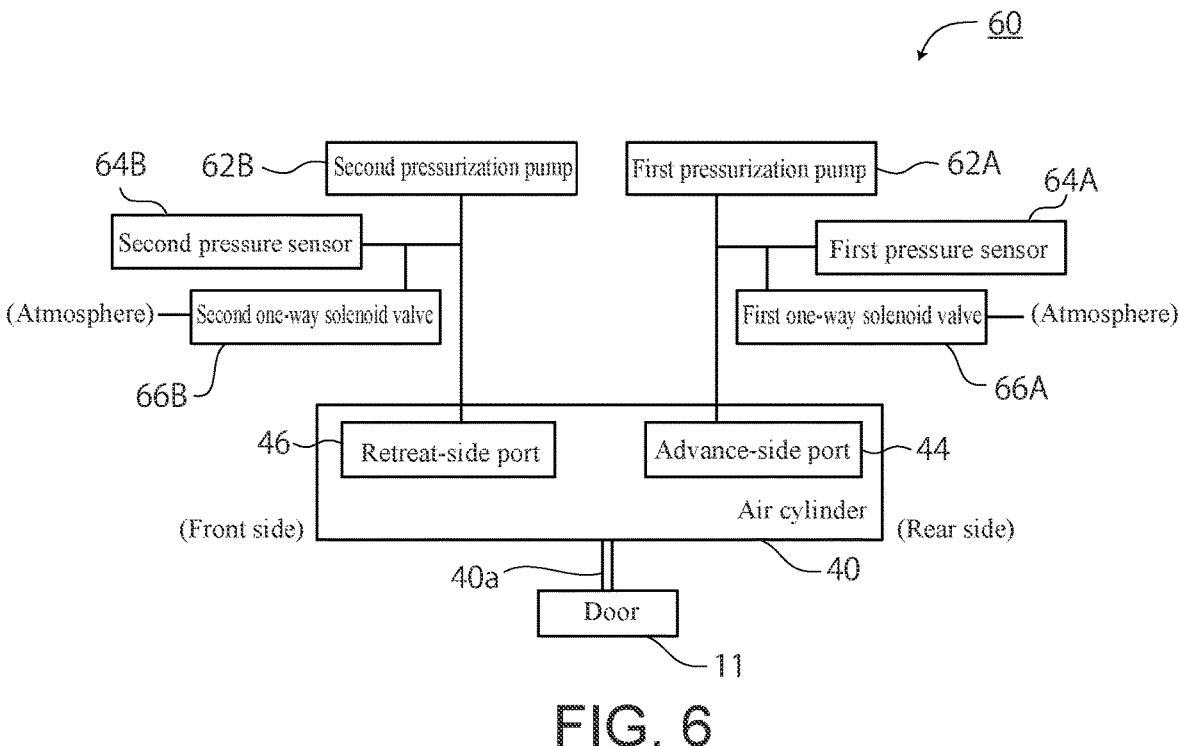

FIG. 6

|  | Door 11 | | Standard state | During calibration |
|---|---|---|---|---|
|  | Automatic opening operation (moves rearward) | Automatic closing operation (moves forward) | Standard state (manually openable and closable) | During calibration |
| First one-way solenoid valve 66A | Open | Close | Open | Close |
| First pressurization pump 62A | Not operate | Pressurize | Not operate | Not operate |
| Second one-way solenoid valve 66B | Close | Open | Open | Close |
| Second pressurization pump 62B | Pressurize | Not operate | Not operate | Not operate |

FIG. 7

State where air bag has deflated

State where air bag has inflated

State where air bag has deflated

State where air bag has inflated

ELECTRONIC BALANCE AND METHOD FOR STABILIZING WEIGHING ACCURACY BY ELECTRONIC BALANCE

TECHNICAL FIELD

The present invention relates to an electronic balance, particularly to an electronic balance for further stabilizing weighing accuracy, and a method for stabilizing weighing accuracy by the electronic balance.

BACKGROUND ART

Conventionally, an electronic balance with high weighing accuracy is provided with a windshield (for example, Patent Literature 1). By covering a weighing pan with the windshield, air flow around the weighing pan, which is one of the factors that lowers accuracy, can be prevented. It is important to prevent a lowering in weighing accuracy and stabilize variation in weighing.

For stabilizing the weighing accuracy, in an electronic balance, it is desirable to perform, before weighing a specimen, a preparation work called "preliminary loading" in which a weight is weighed once as a test. By performing preliminary loading, the weighing accuracy can be further stabilized. The preliminary loading is a work completely different from "calibration" that corrects errors of a weighing mechanism by performing weighing multiple times in the same environment, and is performed to adapt the weighing mechanism to the environment, and particularly, in the first-time weighing after the power supply of the electronic balance is turned on, the weighing mechanism has not adapted to a working environment, and an error easily occurs in a weighing result, and thus it is desirable to perform the preliminary loading in an actual working environment in order to avoid such errors.

CITATION LIST

Patent Literature

[Patent Literature 1] Japanese Published Unexamined Patent Application No. 2012-002677

SUMMARY OF INVENTION

Technical Problem

However, the preliminary loading is a recommended work, and is not an obligation, so that a user forgets or finds it troublesome, and does not perform the preliminary loading in many cases. Particularly, in an electronic balance with a windshield, for maintaining high weighing accuracy, it is desirable to perform the preliminary loading, however, a door of the windshield must be opened and closed for weighing and this takes time and is troublesome, and is typically intentionally avoided.

The present invention was made in view of the problem described above, and an object thereof is to provide an electronic balance for further stabilizing weighing accuracy, and a method for stabilizing weighing accuracy by the electronic balance.

Solution to Problem

In order to solve the problem, according to an aspect of the present disclosure, an electronic balance includes a weighing pan on which a specimen is placed, a weighing mechanism joined to the weighing pan, a windshield including a weighing chamber covering the weighing pan, an opening and closing mechanism configured to automatically open and close a door constituting a portion of a wall of the weighing chamber, a moving up/down mechanism for a built-in weight configured to automatically apply and remove the load of the built-in weight to and from the weighing mechanism, and a control unit configured to control the opening and closing mechanism and the moving up/down mechanism, and calculate a weighed value from a measurement value obtained by the weighing mechanism, and is configured to be capable of performing the following series of operations (I) to (VII) according to a command from the control unit: (I) The opening and closing mechanism opens the door. (II) The moving up/down mechanism applies the load of the built-in weight to the weighing mechanism. (III) The opening and closing mechanism closes the door. (IV) After a predetermined period of time elapses, the opening and closing mechanism opens the door. (V) The moving up/down mechanism removes the load of the built-in weight from the weighing mechanism. (VI) The opening and closing mechanism closes the door. (VII) The control unit performs zero-point adjustment of the weighed value.

According to this aspect, preliminary loading is automatically performed. The weighing mechanism adapts to a surrounding environment, and the weighed value is stabilized from the first-time weighing. A user only has to input a command, and preliminary loading is easily performed.

Further, according to an aspect, the electronic balance includes a temperature sensor configured to measure a temperature inside the weighing chamber, and when the temperature sensor detects that a temperature change in the weighing chamber has reached a predetermined value or more, the series of operations (I) to (VII) are performed by the control unit. According to this aspect, a temperature change is detected and preliminary loading is performed. By adapting the weighing mechanism to a current environment by performing preliminary loading, a temperature change is prevented from slightly influencing the weighing mechanism, and inevitably from adversely affecting the weighing accuracy.

Further, according to an aspect, the electronic balance includes a timer configured to measure an elapsed time from a last opening/closing operation of the door performed by the opening and closing mechanism, and is configured so that as the timer counts a predetermined period of time or longer, the series of operations (I) to (VII) are performed by the control unit. According to this aspect, before the surrounding environment changes with time and adversely affects the weighing mechanism, preliminary loading is performed. The weighing mechanism adapts to a current environment, and an environment change is prevented from adversely affecting weighing.

Further, according to an aspect, a plurality of the doors each constituting a portion of a wall of the weighing chamber, are provided, the opening and closing mechanism is configured to be capable of automatically opening and closing at least two or more of the plurality of doors separately, and when the control unit performs the series of operations (I) to (VII), the control unit causes the opening and closing mechanism to open and close the door other than the door that was opened or closed last. According to this aspect, when preliminary loading is automatically performed, a door to be automatically opened and closed in preliminary loading different from a door to be used for weighing can be closed, and a user who makes preparation for weighing can be prevented from opening the door by mistake and obstructing preliminary loading by the user himself/herself.

Further, according to an aspect, a method for stabilizing the accuracy by an electronic balance is provided which is a preliminary loading method to be performed by an electronic balance including a weighing pan on which a specimen is placed, a weighing mechanism joined to the weighing pan, a windshield including a weighing chamber covering the weighing pan, an opening and closing mechanism configured to automatically open and close a door constituting a portion of a wall of the weighing chamber, a moving up/down mechanism configured to automatically apply and remove the load of a built-in weight to and from the weighing mechanism, and a control unit configured to control the opening and closing mechanism and the moving up/down mechanism, and calculate a weighed value from a measurement value obtained by the weighing mechanism, and includes a first step in which the opening and closing mechanism opens the door, a second step in which following the first step, the moving up/down mechanism applies the load of the built-in weight to the weighing mechanism, a third step in which following the second step, the opening and closing mechanism closes the door, a fourth step in which following the third step, the opening and closing mechanism opens the door after a predetermined period of time elapses, a fifth step in which following the fourth step, the moving up/down mechanism removes the load of the built-in weight from the weighing mechanism, a sixth step in which following the fifth step, the opening and closing mechanism closes the door, and a seventh step in which following the sixth step, the control unit performs zero-point adjustment of the weighed value. According to this aspect, the weighing mechanism of the electronic balance can be further adapted to an environment, so that the weighing accuracy can be stabilized.

Advantageous Effects of Invention

According to the configurations described above, an electronic balance for further stabilizing weighing accuracy, and a method for stabilizing weighing accuracy by the electronic balance, can be provided.

BRIEF DESCRIPTION OF DRAWINGS

FIG. 6 is a block diagram of a door opening and closing mechanism.

FIG. 7 is an operation chart of the door opening and closing mechanism.

FIG. 8A illustrates a state where an air bag has deflated. FIG. 8B illustrates a state where the air bag has inflated.

FIG. 9A illustrates a state where the air bag has deflated. FIG. 9B illustrates a state where the air bag has inflated.

DESCRIPTION OF EMBODIMENTS (Configuration of Electronic Balance with Windshield)

Figure 1:
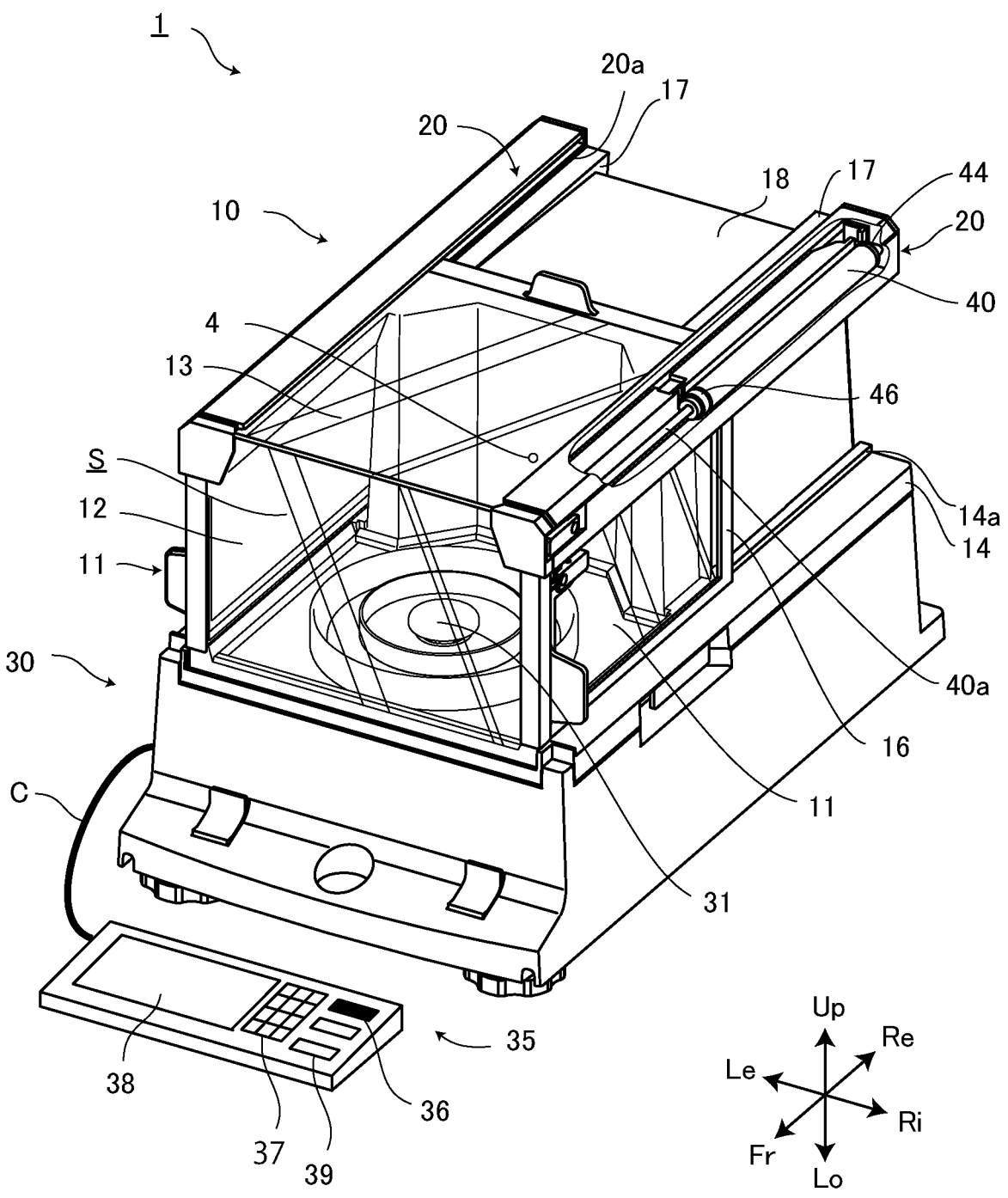
FIG. 1 is a partially broken-away perspective view of an electronic balance according to a preferred embodiment of the present invention.
Figure 2:
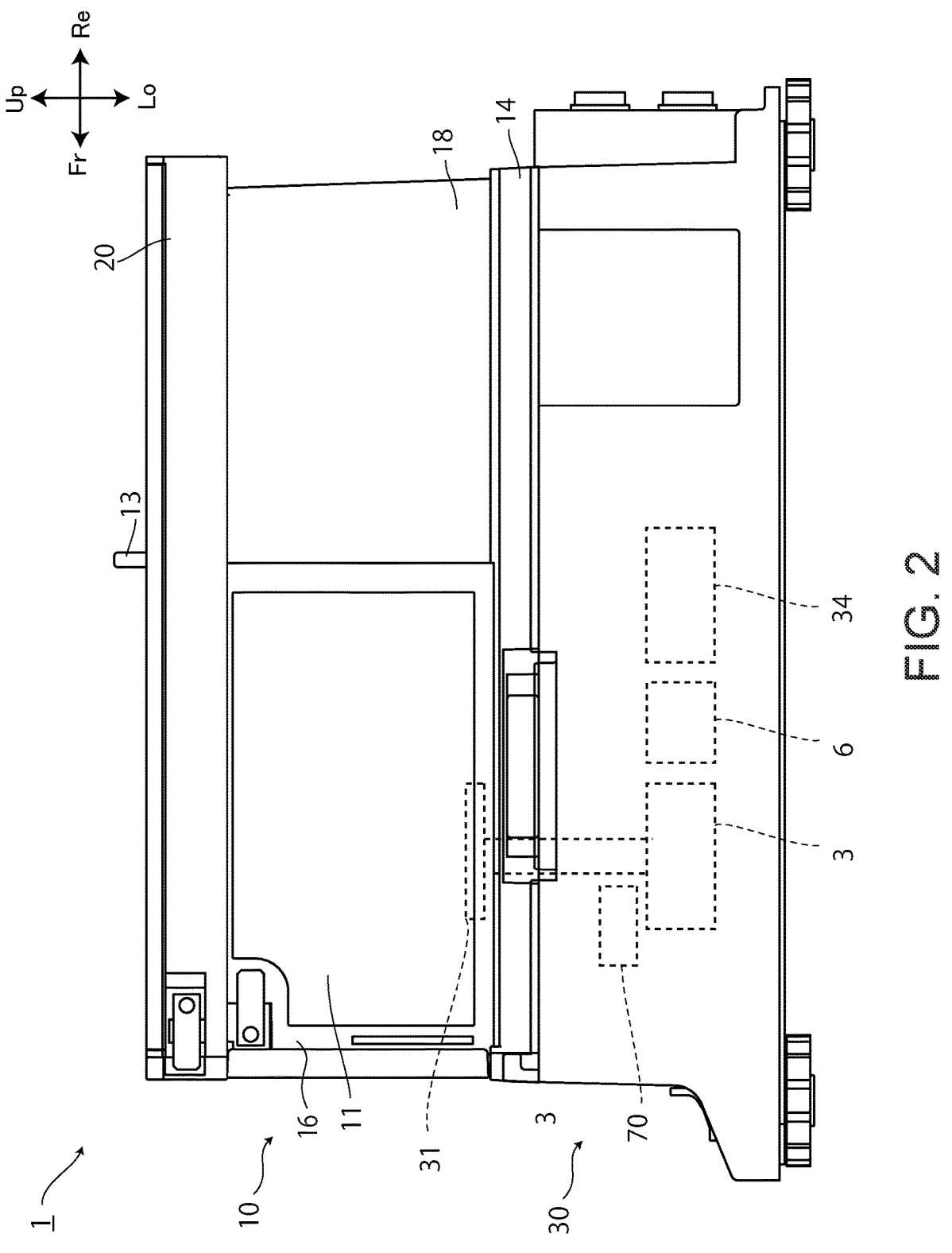
FIG. 2 is a right side view of the same electronic balance.

Hereinafter, preferred embodiments according to configurations of the present disclosure will be described with reference to the drawings. FIG. 1 is a partially broken-away perspective view of an electronic balance 1 according to a preferred embodiment. FIG. 2 is a right side view of the electronic balance 1.

As illustrated in FIGS. 1 and 2, the electronic balance 1 includes a balance main body 30 and a windshield 10. The balance main body 30 includes a weighing pan 31 for placing a specimen on its upper surface. The windshield 10 is disposed on an upper surface of the balance main body 30 so as to enclose the surrounding of the weighing pan 31, and prevents air flow around the weighing pan 31, for example, wind of an air conditioner, breath of a person at the time of weighing, and air flow generated when a person walks, etc., from acting as a wind pressure on a load-applied portion centered on the weighing pan 31 and influencing weighing.

The windshield 10 is detachably attached to the balance main body 30, and for an attaching and detaching mechanism, a conventionally known configuration, for example, the configuration disclosed in Japanese Published Unexamined Patent Application No. 2008-216047 is used, and without limitation to this, a configuration in which the windshield 10 and the balance main body 30 are integrated in a non-separable manner is also possible.

Inside the balance main body 30, a load detecting unit 3 that is joined to the weighing pan 31 and detects a load, an A/D converter 6 that converts an analog signal detected by the load detecting unit 3 into a digital signal, a moving up/down mechanism 70 for a built-in weight which applies and removes the load of the built-in weight to and from the load detecting unit 3, and a control unit 34, are disposed. The control unit 34 is a microcontroller configured by mounting a CPU and a memory, etc., on an integrated circuit, and controls various components based on a program stored in the memory. The load detecting unit 3 is a weighing mechanism of the electronic balance 1.

The load detecting unit 3 is a so-called electromagnetic balance type load sensor, and is a mechanism to detect a load placed on the weighing pan 31 by balancing by using a position detector and an electromagnet in a mechanical balance mechanism. The A/D converter 6 is a device to convert an analog signal into a digital signal, and the load detected by the load detecting unit 3 is converted into a digital signal by the A/D converter 6.

The windshield 10 has a bottomless box shape, and has a front glass 12 at a front surface, a box-shaped case 18 at a back portion, and doors 11 constituting portions of left and right side walls, and an upper surface door 13 at the upper surface, and as a space defined by these, a weighing chamber S having a substantially rectangular parallelepiped shape is formed inside. In the weighing chamber S, a temperature sensor 4 that measures a temperature inside the weighing chamber S is disposed.

The doors 11 can move forward and rearward along rails 14a provided on a base 14 as a frame member at a lower portion of the windshield 10, and the upper surface door 13 can move forward and rearward along rail grooves 20a provided in cylinder boxes 20 on left and right sides of an upper portion of the windshield 10.

The front glass 12, the upper surface door 13, and the left and right doors 11 are made of a transparent glass or resin so that an internal state can be observed. To each of the upper surface door 13 and the doors 11, a handle that assists sliding is attached. The upper surface door 13 can be manually opened and closed, and the doors 11 of the left and right side surfaces are configured to be automatically opened and closed. In the present embodiment, the doors 11 can also be manually opened and closed.

A control panel 35 is for operating the balance main body 30 and the windshield 10, and is provided separately from the balance main body 30 and the windshield 10. This is to prevent vibration caused by an operation such as pushing a switch from influencing weighing. Because the control panel is a separate body, a user can freely locate it at a position easy to operate. The control panel 35 and the balance main body 30 are connected by a cable C. Data transmission and reception by these may be performed wirelessly. Similarly, the balance main body 30 and the windshield 10 are connected by a cable not illustrated, and can transmit and receive data.

The control panel 35 includes, on its upper surface, a display unit 38 that displays weighing results and states, an input unit 37 for operation, an infrared sensor 36, and a push switch 39. The infrared sensor 36 is an opening and closing switch of the doors 11, and only by placing a hand over the infrared sensor, the doors 11 can be automatically opened and closed. To automatically open and close the doors 11, a push switch may be provided instead of the infrared sensor 36, or it is also preferable that both of the push switch and the infrared sensor 36 are provided. To the infrared sensor 36, a balance operating function other than the opening and closing function for the doors 11 may be assigned. A configuration in which two left and right infrared sensors 36 are provided, and are caused to respectively open and close corresponding doors 11 is also possible.

The electronic balance 1 is provided with a preliminary loading function to automatically perform preliminary loading, and the push switch 39 is a trigger to start operation of preliminary loading. By pushing the push switch 39 by a user, operation of preliminary loading is performed. In the present embodiment, a switch dedicated for the preliminary loading function is provided, so that the operation of preliminary loading is started with a single touch, and it is also possible that the start of the preliminary loading function is input from the input unit 37.

Fixing members 17 are provided to constitute left and right upper sides of the windshield 10 having a substantially rectangular parallelepiped shape, and the cylinder boxes 20 engage with the fixing members 17 so that their longitudinal directions match each other. The cylinder box 20 is a hollow housing, and inside, an air cylinder 40 as a driving means to open and close the door 11 is housed.

The air cylinder 40 is a double-acting type, and both of the forward and backward strokes of reciprocating motion of a piston inside the air cylinder 40 are made by air pressure, so that ports to feed air to the inside of the air cylinder 40 are provided at two positions. A retreat-side port 46 for making the piston move rearward by fed air is provided at the front side of the air cylinder 40, and an advance-side port 44 for making the piston move forward is provided at the rear side. To the advance-side port 44 and the retreat-side port 46, air tubes not illustrated are connected, and are linked to the inside of the case 18. Inside the case 18, pumps serving as drive sources of the air cylinders 40 and solenoid valves to control the flow and stoppage of air, etc., are housed.

(Structure of Door)

Figure 3:
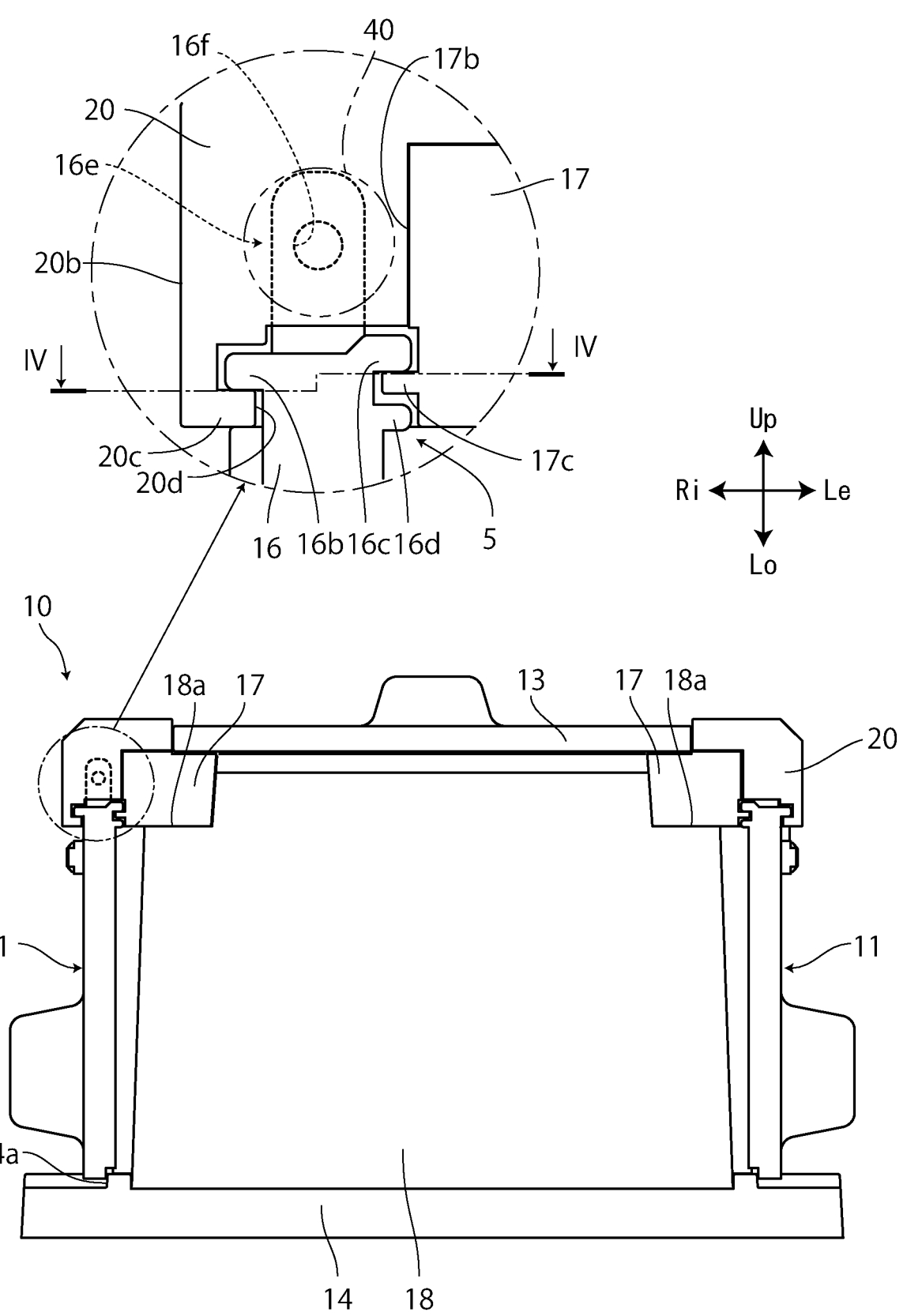
FIG. 3 is a back view of a windshield of the same electronic balance.
Figure 4:
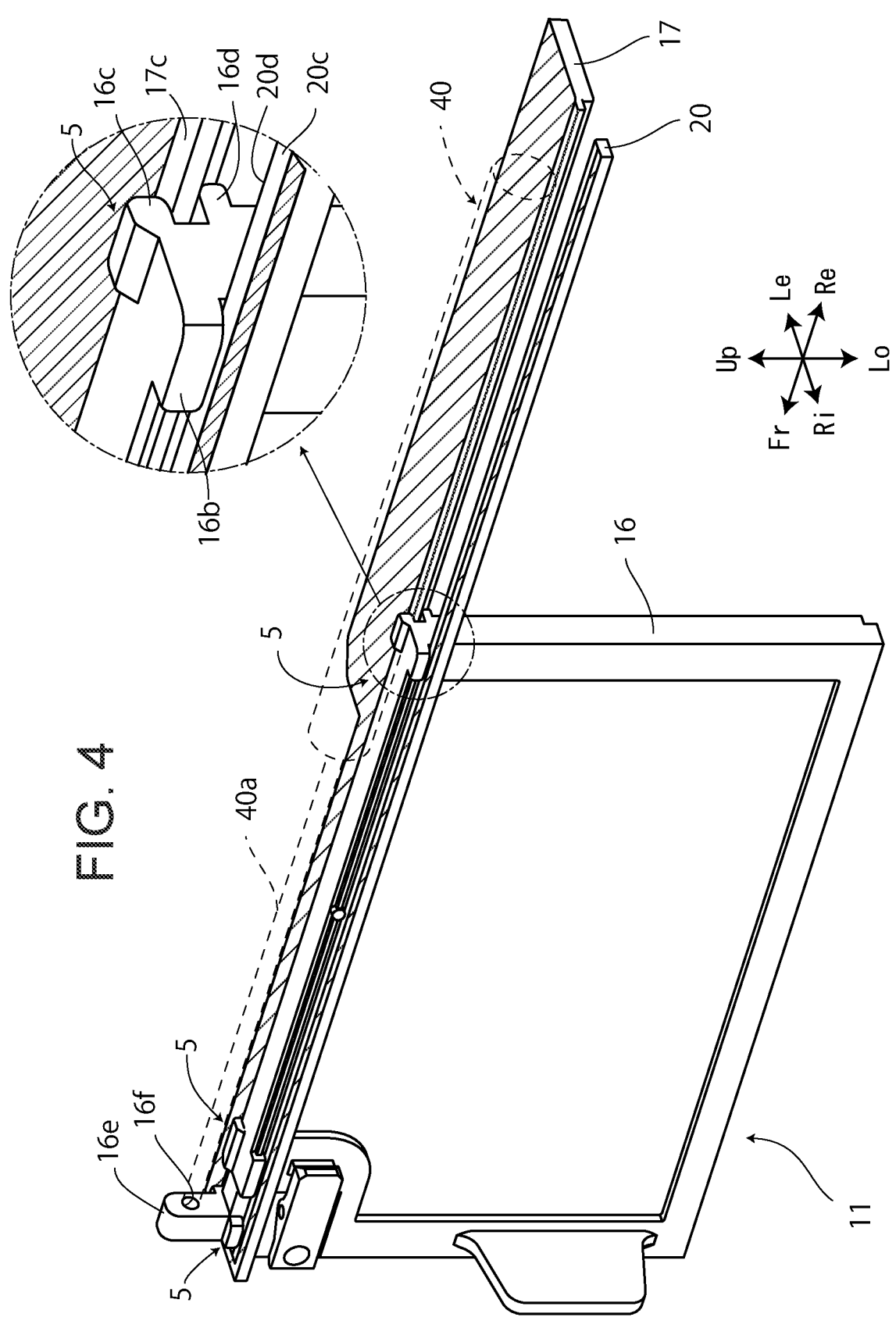
FIG. 4 is an explanatory view of a hanging mechanism of a door.

A structure of the door 11 will be described. FIG. 3 is a back view of the windshield 10. FIG. 4 is an explanatory view for describing a shape and configuration of the door 11, and illustrates only the door 11, the cylinder box 20, and the fixing member 17, and is a partial sectional perspective view of the cylinder box 20 and the fixing member 17 cut along line IV-IV in FIG. 3.

The cylinder box 20 is a hollow housing, and a recess portion is formed in an inner wall of the cylinder box 20 to match the shape of the air cylinder 40 (not illustrated), and the air cylinder 40 is disposed inside the cylinder box 20 and engaged and fixed in the recess portion.

The pair of fixing members 17 are substantially rectangular parallelepiped members that are long in one direction, and are disposed along concave portions 18a provided at left and right edge portions of an upper portion of the case 18, and constitute frame members of an upper portion of the windshield 10. The cylinder box 20 has an external form of a pushed-out reversed L shape in a back view, and an upper side portion is placed on an upper surface of the fixing member 17, an inner surface comes into contact with a side surface of the fixing member 17, and a right-angle portion of the reversed L shape engages with a corner portion of the fixing member 17, and the cylinder box 20 is fixed so that its longitudinal direction matches the longitudinal direction of the fixing member 17.

The cylinder box 20 does not have a bottom surface (refer to FIG. 3), and an upper portion of the door 11 is disposed to enter the inside of the cylinder box 20. At a lower end portion of an outer side surface 20b of the cylinder box, an inner flange 20c is formed inward over the entire length in the longitudinal direction. In addition, at a lower portion of an outer side surface 17b of the fixing member 17, a projecting portion 17c extending over the entire length in the longitudinal direction (front-rear direction) is formed to face the inner flange 20c.

The door 11 is held by a holder 16 provided at an entire outer edge portion. At two front and rear positions of an upper portion of the holder 16, holding portions 5 projecting in a thickness direction (left-right direction) of the door 11 are formed orthogonal to a sliding direction (front-rear direction) of the door 11. The upper portion of the door 11 enters a slit (hereinafter, referred to as a guide hole 20d) formed between the inner flange 20c and the projecting portion 17c, and the holding portion 5 of the holder 16 engages with the inner flange 20c and the projecting portion 17c, and holds the door 11 in a hanging manner. Accordingly, the door 11 is disposed to separate from the upper surface of the base 14 and the upper surface of the rail 14a formed on the base, and is held slidably along the guide hole 20d. When dust and sand, etc., enter the rail 14a, a sliding resistance when opening and closing the door 11 increases, which makes it difficult to open and close the door 11, and this problem is prevented by hanging the door 11 itself from the upper portion.

The inner flange 20c and the projecting portion 17c are formed so as not to directly face each other but to be slightly offset in the up-down direction, and the projecting portion 17c at the inner side is at a position slightly higher than the inner flange 20c. This is to hold the door 11 in a stable posture by making slightly higher the inner side of the holding portion to incline the door 11 inward and bringing a lower portion of the door 11 into contact with the side surface of the rail 14a rather than the holding portion 5 projecting to the left and right at the same height from the upper portion of the door 11 and causing a state where the door 11 easily wobbles both leftward and rightward. With this configuration, the door 11 does not wobble when moved, and when opening and closing the door 11, the door 11 can be moved in a state of being kept in the same posture, and unexpected sliding of the door 11 can be prevented.

The holding portion 5 of the door 11 is formed to match the shapes and heights of the inner flange 20c and the projecting portion 17c, and consists of a first engagement portion 16b formed to project toward the inner flange 20c side disposed at the outer side, a second engagement portion 16c formed to project toward the projecting portion 17c side disposed at the inner side, and a third engagement portion 16d formed by being offset to the lower side of the second engagement portion 16c.

The third engagement portion 16d is formed to sandwich the projecting portion 17c between the third engagement portion 16d and the second engagement portion 16c, but the third engagement portion 16d is formed with a gap so as to be spaced from a bottom surface of the projecting portion 17c.

As illustrated in FIG. 4, at a front end upper portion of the holder 16, a coupling portion 16e is formed. The coupling portion 16e is provided to project to the upper side of the door 11, and in the center of the coupling portion, a coupling hole 16f is formed along the sliding direction of the door 11. A tip end of a piston rod 40a extending from the piston inside the air cylinder 40 is fitted and fixed into the coupling hole 16f. The piston (piston rod 40a) is connected to the door 11 by the holder 16, and by the piston being moved forward and rearward by air pressure, the holder 16 slides along the guide hole 20d, so that the door 11 opens and closes.

Even in the state where the holder 16 is engaged with the inner flange 20c, the air cylinder 40 does not come into contact with an upper surface of the holder 16, and is fixed at a distance from the holder 16 (refer to FIG. 3), and the air cylinder 40 does not obstruct movement of the door 11. The coupling portion 16e projects to a higher position than the upper surface of the holder 16, however, because the coupling portion 16e is fixed to the tip end of the piston rod 40a, the coupling portion 16e does not enter the lower side of the air cylinder 40, and a path of the coupling portion 16e is secured inside the cylinder box 20, so that the cylinder box 20 and the coupling portion 16e do not interfere with each other.

In the present embodiment, the hanging support form of the door 11 is configured as described above, however, other conventionally known configurations may be used such as a form in which the holding portion 5 formed into a T shape is engaged in a slit formed in a flat plate or a form in which the holding portion 5 is formed into a hook shape and engaged with a projecting rail.

(Block Diagram)

Figure 5:
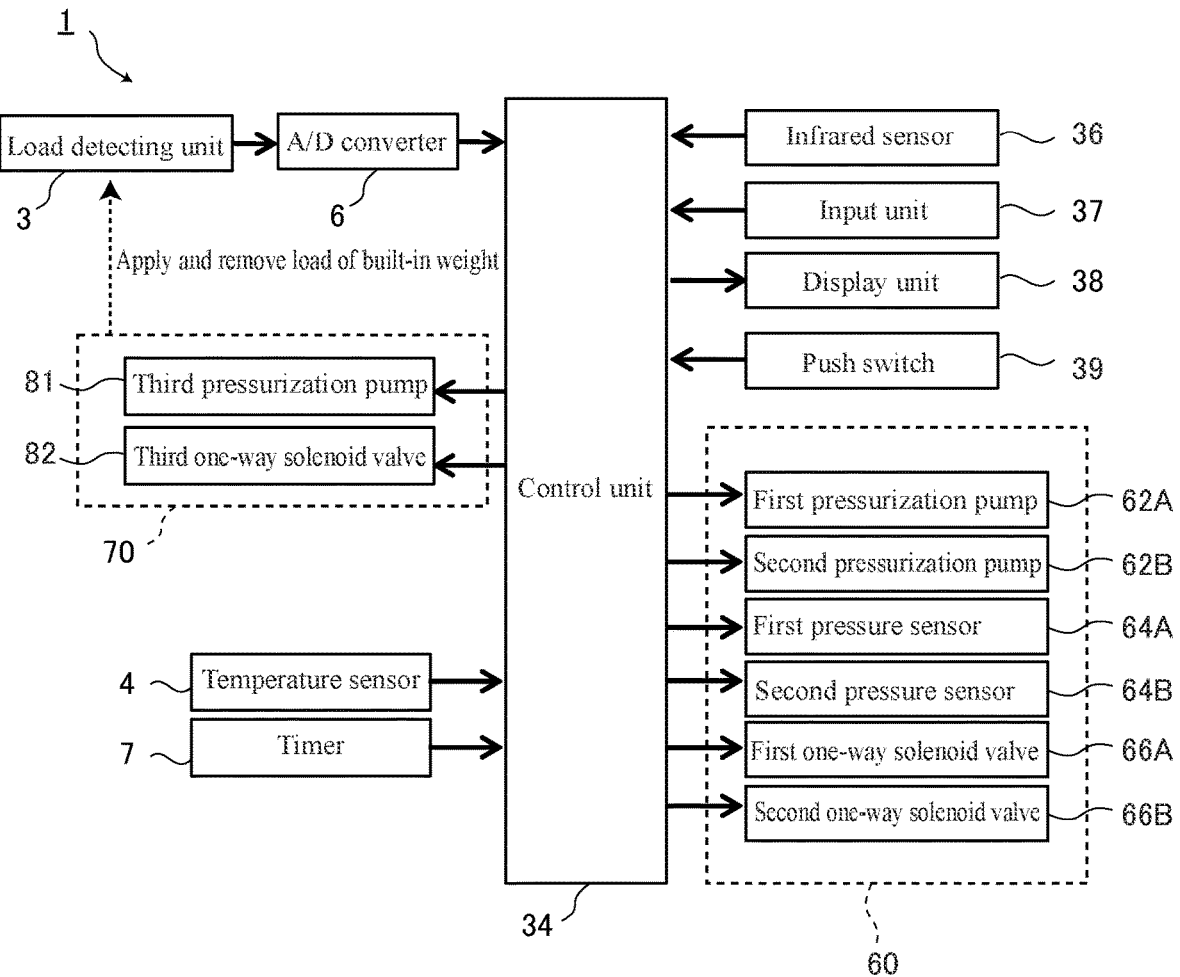
FIG. 5 is a block diagram of the same electronic balance.

FIG. 5 is a block diagram of a control system of the electronic balance 1. FIG. 6 is a block diagram of an opening and closing mechanism 60 for opening and closing the door 11.

As illustrated in FIG. 5, a load detected by the load detecting unit 3 is converted into a digital signal by the A/D converter 6, and input to the control unit 34 (hereinafter, a value that is detected by the load detecting unit 3, converted by the A/D converter 6, and input to the control unit is referred to as an AD value). From the input measurement value, the control unit 34 calculates a weighed value according to a program and a correction value stored in the memory, and displays the weighed value on the display unit 38. The correction value is for adjusting a value that changes according to the environment and state, such as a temperature change and a gravity value that depends on the latitude, etc. The control unit 34 also performs zero-point adjustment. In the zero-point adjustment, a state where no specimen is placed on the weighing pan 31 is used as a reference, and based on this state, a weighed value is adjusted to zero.

Calculation of a weighed value by the electronic balance main body 30 in the present embodiment refers to calculation of a difference indicating a change in AD value according to application of a load such as placing of a specimen as a weighed value with reference to an AD value in the state where no specimen is placed. Even when no specimen is placed on the weighing pan 31, a load of the weighing pan 31 is always applied to the load detecting unit 3, and an AD value in this state is displayed as "Weighed value: 0 g" on the display unit 38. The AD value also changes according to a temperature change or with time, so that the control unit 34 sets "Weighed value: 0 g" according to the zero-point adjustment, with reference to an AD value at this time.

Commands input with the input unit 37, the infrared sensor 36, and the push switch 39, and a temperature inside the weighing chamber S measured by the temperature sensor 4, are input to the control unit 34. A count counted by the timer 7 is also input to the control unit 34. As the timer 7, a built-in clock of the control unit 34 may be used.

The control unit 34 further controls the opening and closing mechanism 60 and the moving up/down mechanism 70. Specifically, the control unit 34 is connected to a first pressurization pump 62A, a second pressurization pump 62B, a first pressure sensor 64A, a second pressure sensor 64B, a first one-way solenoid valve 66A, and a second one-way solenoid valve 66B constituting the opening and closing mechanism 60, and a third pressurization pump 81 and a third one-way solenoid valve 82 constituting the moving up/down mechanism 70, and controls starting and stoppage of each pressurization pump and opening and closing of each solenoid valve. The control unit 34 generates various command signals based on input signals.

In the present embodiment, pressurization pumps are used as driving means of the opening and closing mechanism 60 and the moving up/down mechanism 70, however, without limitation to these, both of these mechanisms may be configured by using other driving means such as oil pumps, racks-and-pinions and pulley belts using motors as driving means, etc.

The opening and closing mechanism 60 illustrated in FIG. 6 is a mechanism for opening and closing the door 11, and each of the left and right doors 11 includes the opening and closing mechanism 60, and is controlled independently by the connected opening and closing mechanism 60. In the present embodiment, a pump for moving forward (advancing) the piston inside the air cylinder 40 (further, the piston rod 40a extended from the piston) and a pump for moving backward (retreating) the piston are separately provided.

The opening and closing mechanism 60 includes the first pressurization pump 62A, the second pressurization pump 62B, the first pressurization sensor 64A, the second pressurization sensor 64B, the first one-way solenoid valve 66A, the second one-way solenoid valve 66B, and the air cylinder 40. The air cylinder 40 is connected to the door 11 via the piston rod 40a.

Both of the first pressurization pump 62A and the second pressurization pump 62B are air pumps. These pumps are drive sources of the air cylinder 40, and compress air and feed the compressed air to the air cylinder 40, and move the piston by air pressure to move the door 11.

Outlet sides of the first one-way solenoid valve 66A and the second one-way solenoid valve 66B are opened to the atmosphere, and by opening and closing the valves, the flow and stoppage of air are controlled.

The first pressure sensor 64A monitors a pressure of air discharged from the first pressurization pump 62A, and the second pressure sensor 64B monitors a pressure of air discharged from the second pressurization pump 62B. As the first pressure sensor 64A and the second pressure sensor 64B are respectively connected to the air cylinder 40, in other words, the pressure sensors monitor a pressure of air to be supplied to the air cylinder 40 and a pressure of air inside the air cylinder.

To the advance-side port 44 provided at the rear side of the air cylinder 40, the first pressurization pump 62A is connected. This connection has a branch halfway, and the first pressure sensor 64A and the first one-way solenoid valve 66A are further connected. To the retreat-side port 46 provided at the front side of the air cylinder 40, the second pressurization pump 62B is connected. This connection has a branch halfway, and the second pressure sensor 64B and the second one-way solenoid valve 66B are connected.

The air cylinder 40 as a drive source of the door 11 is disposed inside the cylinder box 20, and other components of the control system, that is, the first pressurization pump 62A, the second pressurization pump 62B, the first pressure sensor 64A, the second pressure sensor 64B, the first one-way solenoid valve 66A, and the second one-way solenoid valve 66B are disposed inside the case 18.

(Operations when Opening and Closing Door)

Next, operations of the respective components when automatically opening and closing the door 11 will be described. FIG. 7 is an operation chart of the opening and closing mechanism 60.

First, in a "standard state" where a user can manually open and close the door 11, neither of the first pressurization pump 62A and the second pressurization pump 62B are activated, and the first one-way solenoid valve 66A and the second one-way solenoid valve 66B are open. The first pressurization pump 62A and the second pressurization pump 62B do not operate and the first one-way solenoid valve 66A and the second one-way solenoid valve 66B are open to cause communication with the atmosphere, so that no load is applied from the air cylinder 40, and the door 11 can be smoothly opened and closed manually.

When an input of a command "Open/close door", for example, an input from the infrared sensor 36, is made, the control unit 34 commands the respective components to operate.

In a case of an "automatic opening operation" to open the door 11, that is, in a case where the piston inside the air cylinder 40 is moved rearward, the second one-way solenoid valve 66B is closed, and pressurization of the second pressurization pump 62B is started. At this time, the first pressurization pump 62A is not activated, and the first one-way solenoid valve 66A is open, so that the piston is moved rearward by an air pressure, and the door 11 is opened.

When the door 11 fully opens, the air pressure rapidly increases, so that when this change is detected by the second pressure sensor 64B, the second pressurization pump 62B is stopped, the second one-way solenoid valve 66B is opened, and the compressed air inside the air cylinder is released to the atmosphere, and the mechanism returns to the standard state.

In a case of an "automatic closing operation" to close the door 11, that is, in a case where the piston inside the air cylinder 40 is moved forward, the first one-way solenoid valve 66A is closed, and pressurization of the first pressurization pump 62A is started. At this time, the second pressurization pump 62B does not operate, and the second one-way solenoid valve 66B is open, so that the piston is moved forward by an air pressure, and the door 11 is closed.

When the door 11 fully closes, the air pressure rapidly increases again, so that when this change is detected by the first pressure sensor 64A, the first pressurization pump 62A is stopped, the first one-way solenoid valve 66A is opened, and the compressed air inside the air cylinder is released to the atmosphere, and the mechanism returns to the standard state.

Further, the door 11 is automatically locked during calibration operation. The door 11 may be configured to be locked according to a command from the input unit 37. Not only during calibration, the door 11 can also be locked during transportation.

(Moving Up/down Mechanism 70 of Built-in Weight)

Figure 8A:
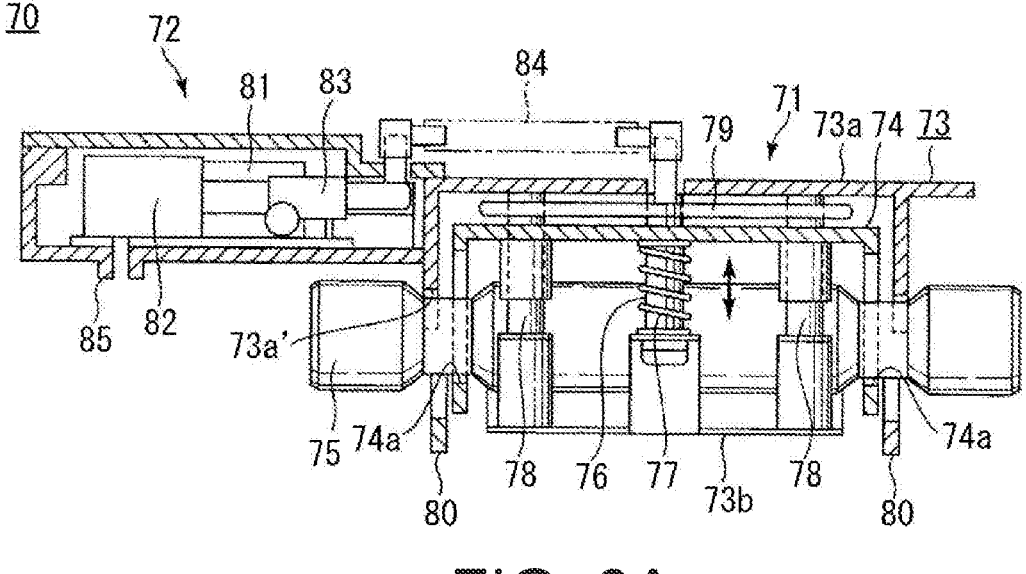
FIGS. 8A and 8B are longitudinal sectional views of a moving up/down mechanism fora built-in weight, and are sectional views taken along line A-A in FIG. 9A.
Figure 8B:
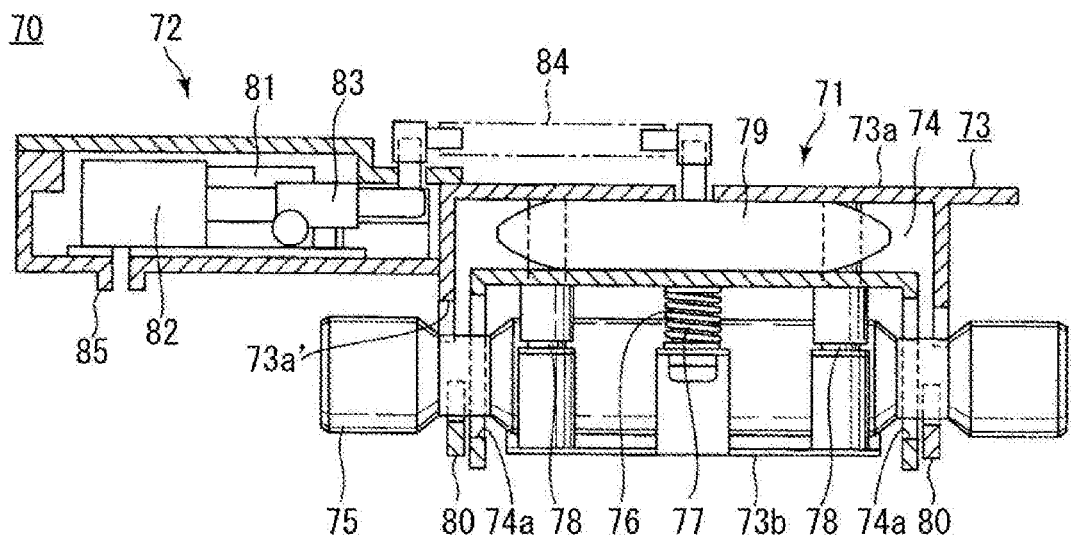
Figure 9A:
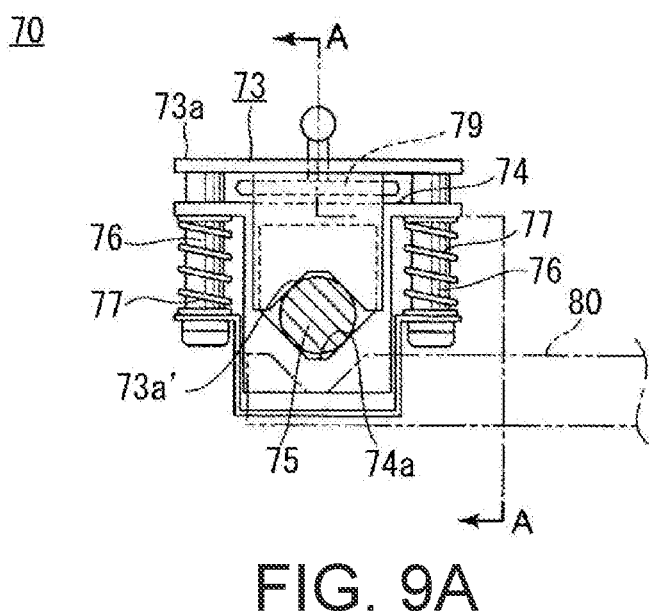
FIGS. 9A and 9B are sectional views of a moving up/down mechanism for a built-in weight in a direction orthogonal to an axial center of the built-in weight.
Figure 9B:
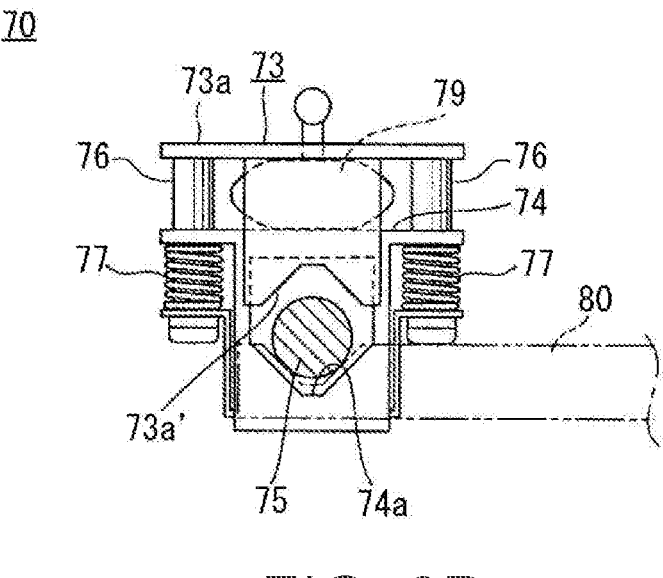

The moving up/down mechanism 70 of the built-in weight is illustrated in FIGS. 8A, 8B, 9A and 9B. FIGS. 8A and 8B are sectional views of the moving up/down mechanism 70 of the built-in weight, and are sectional views taken along line A-A illustrated in FIG. 9A. FIGS. 9A and 9B are sectional views of the moving up/down mechanism 70 of the built-in weight in a direction orthogonal to the axial center of the built-in weight. FIGS. 8A and 9A illustrate a state where an air bag has deflated (minimum volume of the air bag). FIGS. 8B and 9B illustrate a state where the air bag has inflated (maximum volume of the air bag). The moving up/down mechanism 70 of the built-in weight is an example, and the moving up/down mechanism of the built-in weight is not limited to this. For example, in the present embodiment, a pump is used for moving up/down the built-in weight, however, a rack-and-pinion or a feed screw, etc., may be used to move up/down the built-in weight.

The moving up/down mechanism 70 of the built-in weight is a mechanism that loads or unloads the built-in weight onto and from a load receiving portion of the load detecting unit 3 to apply or remove the load of the built-in weight (apply load or no load) to and from the load detecting unit 3. Applying/removing a load of the built-in weight to and from the load detecting unit 3 is a built-in weight weighing operation, and with respect to the load detecting unit 3, this operation is equivalent to loading/unloading of a weight or the like onto and from the weighing pan 31.

As illustrated in FIGS. 8A, 8B, 9A, and 9B, the moving up/down mechanism 70 of the built-in weight includes a moving up/down unit 71 that directly moves up and down the built-in weight 75, and an air intake and exhaust unit 72 that supplies air and exhausts supplied air to move up and down the built-in weight 75.

First, a configuration of the moving up/down unit 71 will be described. A fixing portion 73 is a frame of the moving up/down unit 71, and the moving up/down mechanism 70 is fixed to the balance main body 30 via the fixing portion 73. Members constituting the moving up/down unit 71 are directly or indirectly fixed to the fixing portion 73. The fixing portion 73 includes an upper fixing portion 73a, and a lower fixing portion 73b connected continuously to the upper fixing portion 73a.

A weight holder 74 that holds the built-in weight 75 is configured to be capable of moving up and down with respect to the fixing portion 73.

A drive pin 76 has a lower end fixed to the lower fixing portion 73b, and an upper end fixed to the upper fixing portion 73a. The drive pin 43 is provided with a coil spring 77 as an elastic body. The coil spring 77 is positioned between a lower end of the drive pin 76 and a lower surface portion of the weight holder 74, and accordingly, by a resilient force of the coil spring, the weight holder 74 is biased toward the upper fixing portion 73*a*, that is, the upward direction.

Like the drive pin 76, a guide pin 78 has a lower end fixed to the lower fixing portion 73*b* side, and an upper end fixed to the upper fixing portion 73*a*, however, the guide pin 78 is not provided with a coil spring, and functions as a guide to guide upward and downward movements of the weight holder 74.

An air bag 79, which is an airtight container whose volume changes according to air flowing-in and exhaustion, is disposed in a space portion between the upper fixing portion 73*a* and the weight holder 74. FIGS. 8A and 9A illustrate a state where air inside the air bag 79 has been exhausted and the air bag 79 has deflated to the minimum volume.

In the state where the air bag 79 has the minimum volume, the weight holder 74 is positioned at an uppermost portion due to the resilient force of the coil spring 77. In this state, the front and rear of the built-in weight 75 are sandwiched between an upper lock portion 73*a'* of the upper fixing portion 73*a* and a lower lock portion 74*a* of the weight holder 74, and the built-in weight 75 is reliably fixed at a moved-up position. By thus fixing the built-in weight 75, the built-in weight 75 does not move even when the electronic balance 1 is moved or transported.

The load receiving portion 80 positioned at a lower portion of the moving up/down unit 71 is a load receiving portion to transmit the load of the built-in weight 75 to the load detecting unit 3, and is connected to the load detecting unit 3.

A configuration of the air intake and exhaust unit 72 is described. The air intake and exhaust unit 72 is configured as an integrated device connected continuously to the moving up/down unit 71, and the air intake and exhaust unit 72 includes the third pressurization pump 81, the third one-way solenoid valve 82 for exhausting air, and an air filter 83. An outlet side of the third one-way solenoid valve 82 is connected to an air hole 85 that is an air intake and exhaust port.

The third pressurization pump 81 and an upper portion of the drive pin 76 are connected by an air tube 84, and air fed from the third pressurization pump 81 passes through the air tube 84 and pushes up the drive pin 76.

Next, operation of the moving up/down mechanism 70 configured as described above will be described. First, when the electronic balance 1 is in a normal weighable state, as illustrated in FIGS. 8A and 9A, the air bag 79 has the minimum volume, and accordingly, the built-in weight is positioned at the uppermost portion so that the load of the built-in weight 75 is not applied to the load detecting unit 3. That is, FIGS. 8A and 9A illustrate a no-load state where the load of the built-in weight 75 is not applied to the load detecting unit 3.

When applying the load of the built-in weight 75 to the load detecting unit 3, the third pressurization pump 81 of the air intake and exhaust unit 72 is activated. Air discharged from the third pressurization pump 81 is supplied to the air bag 79 through the air filter 83 and the air tube 84. Due to the air feed, the air bag 79 gradually inflates, and its volume increases and causes the weight holder 74 to move down against the resilient force of the coil spring 77 of the drive pin 76. That is, the air bag 79 is a drive means for moving down the weight holder 74.

FIGS. 8B and 9B illustrate a state where the weight holder 74 has moved down to a lowermost portion due to inflation of the air bag 79. As the weight holder 74 moves down, the built-in weight 75 supported by the weight holder 74 is locked on the load receiving portion 80 (loaded on the load receiving portion 80), and the full load of the built-in weight 75 is applied to the load receiving portion 80. Accordingly, the load of the built-in weight 75 is applied to the load detecting unit 3. That is, FIGS. 8B and 9B illustrate a state where the load of the built-in weight 75 is applied to the load detecting unit 3.

When removing the applied load of the built-in weight 75, the third one-way solenoid valve 82 of the air intake and exhaust unit 72 is opened, and the inside of the air bag 79 is communicated with the atmosphere through the air hole 85. As a result, the resilient force of the coil spring 77 is restored, and due to this resilient force, the weight holder 74 starts to move up, and in response to this upward movement, air inside the air bag 79 passes through the third one-way solenoid valve 82 through the air tube 84 and is released to the outside from the air hole 85. In response to this, the built-in weight 75 is unloaded from the load receiving portion 80, and the built-in weight 75 that had been locked on the load receiving portion 80 side is locked by the weight holder 74 again. Finally, the weight holder 74 moves up the built-in weight 75 to the uppermost portion illustrated in FIGS. 8A and 9A, and is fixed at this position by the resilient force of the coil spring 77. The third one-way solenoid valve 82 is closed, and the state returns to the normal weighable state.

As described above, the moving up/down mechanism 70 realizes application and removal of the load of the built-in weight 75 to and from the load detecting unit 3 by volume increase/decrease (inflation/deflation) of the air bag 79.

(Flowchart)

Figure 10:
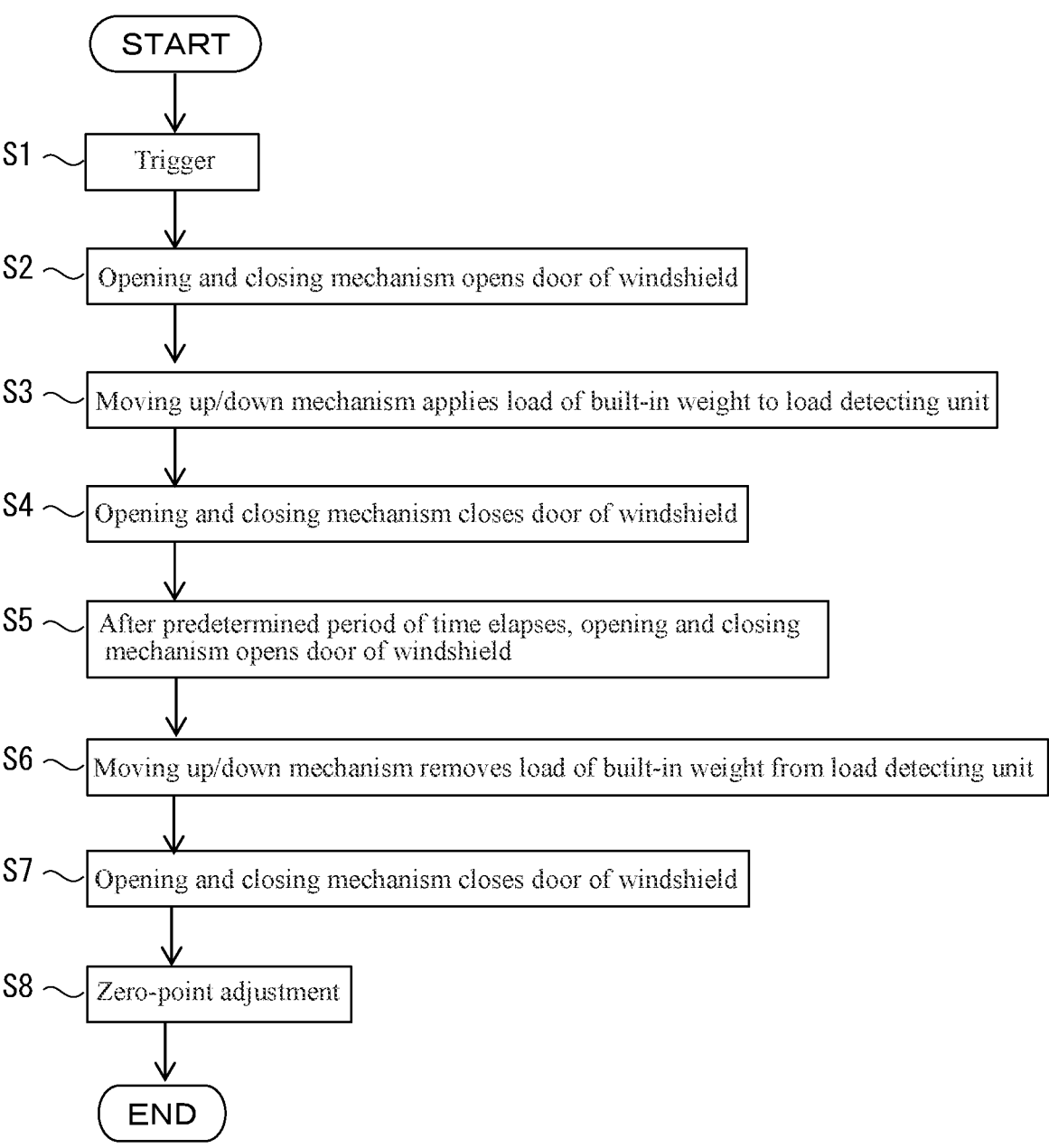
FIG. 10 is a flowchart of preliminary loading.

Next, an operation flow according to the preliminary loading function of the electronic balance 1 will be described with reference to the drawing. FIG. 10 is a flowchart of preliminary loading.

First, in Step S1, a user pushes the push switch 39. By using this as a trigger, operation of preliminary loading is started. Other cases of triggering the start of the preliminary loading will be described later.

Next, in Step S2, the opening and closing mechanism 60 opens the door 11. Specifically, according to a command of the control unit 34, the second one-way solenoid valve 66B is closed, and the second pressurization pump 62B is started to operate. At this time, the first one-way solenoid valve 66A is left open, and the first pressurization pump 62A is not activated (refer to FIGS. 6 and 7). Accordingly, air is fed to the retreat-side port 46, and due to air pressure, the piston (piston rod 40*a*) of the air cylinder 40 moves to the rear side. The door 11 joined to the piston rod 40*a* moves rearward, and the door 11 is opened. Accordingly, the environment temperature inside the weighing chamber S becomes equivalent to the environment temperature outside the weighing chamber S.

Next, in Step S3, the moving up/down mechanism 70 applies the load of the built-in weight 75 to the load detecting unit 3. First, the control unit 34 closes the third one-way solenoid valve 82, activates the third pressurization pump 81, and causes it to feed air into the air bag 79 through the air tube 84. The fed air inflates the air bag 79, and the built-in weight 75 is loaded on the load receiving portion 80, and accordingly, the full load of the built-in weight 75 is applied to the load detecting unit 3 joined to the load receiving portion 80.

Next, in Step S4, the opening and closing mechanism 60 closes the door 11. Specifically, according to a command of the control unit 34, the first one-way solenoid valve 66A is closed, and the first pressurization pump 62A is started to operate. At this time, the second one-way solenoid valve 66B is left open, and the second pressurization pump 62B is not activated (refer to FIGS. 6 and 7). Accordingly, air is fed to the advance-side port 44, and due to air pressure, the piston (piston rod 40a) of the air cylinder 40 moves to the front side. The door 11 joined to the piston rod 40A moves forward, and the door 11 is closed. Accordingly, the environment temperature inside the weighing chamber S is made equivalent to the environment temperature outside the weighing chamber S, and a state equivalent to that where weighing is performed with a weight or the like loaded on the weighing pan 31 is reached.

Next, in Step S5, after a predetermined period of time elapses, the opening and closing mechanism 60 opens the door 11. First, in order to stabilize a weighed value of the built-in weight 75 in Step S4, elapse of the predetermined period of time is waited for. Then, the door 11 is opened. A detailed command to open the door 11 for the opening and closing mechanism 60 from the control unit 34 is the same as in Step S2.

Next, in Step S6, the moving up/down mechanism 70 removes the load of the built-in weight 75 from the load detecting unit 3. Specifically, the control unit 34 opens the third one-way solenoid valve 82 and communicates air inside the air bag 79 with the atmosphere. The air bag 79 deflates, and the built-in weight 75 is unloaded from the load receiving portion 80 and held by the weight holder 74.

Next, in Step S7, the opening and closing mechanism 60 closes the door 11. A detailed operation is the same as in Step S4.

Next, in Step S8, the control unit 34 performs zero-point adjustment of the weighed value.

Accordingly, the series of preliminary loading operations are finished, and then, a worker can shift to an actual weighing work.

(Action and Effect)

Action and effect of the operations carried out in the flow described above will be described.

In a high-accuracy balance like an electronic balance, it is recommended to perform preliminary loading by performing weighing once as test weighing before an actual weighing work. Particularly, in first-time weighing after the power supply of the electronic balance is turned on, a slight deviation of the weighed value easily occurs although it is within a permissible range, so that it is recommended to perform preliminary loading to adapt the weighing mechanism to a weighing environment and improve the stability of the weighing results, and further, in order to confirm return to the zero point, performing of the preliminary loading is also recommended.

In an electronic balance with a windshield, in order to eliminate a difference between a temperature inside the weighing chamber and a temperature outside the weighing chamber and adapt the weighing mechanism to a work environment, the door must be opened and closed in preliminary loading, however, a user holds tweezers or a pen by hand in many cases, and it is very troublesome to open and close the door of the weighing chamber or take up a weight for preliminary loading, and there are many cases where the preliminary loading is not performed.

In the present embodiment, just by pushing the push switch 39 of the electronic balance 1 by a user, the series of preliminary loading operations are automatically performed. That is, the series of operations are performed in line with the user's operations to open the door (Step S2), apply the load of the weight to the weighing mechanism (Step S3), close the door and perform weighing (Step S4), and after weighing is ended, open the door (Step S5), take out the weight (Step S6), close the door (Step S7), and perform zero-point adjustment (Step S8). Because all operations are automatically performed, the user only has to wait after pushing the push switch 39. According to the preliminary loading function to automatically perform preliminary loading, the user can focus only on weighing without performing extra operations.

Preliminary loading of the electronic balance with a windshield can be performed with a single touch, and this is user-friendly and improves the weighing accuracy through the preliminary loading, allowing a user to weigh a specimen with stable high accuracy.

It is preferable that the user is informed that preliminary loading is being performed or has been finished by turning on a lamp and displaying "Under preliminary loading" on the display unit 38 during preliminary loading, or sounding a buzzer at the end of the preliminary loading. After pushing the push switch 39, the user can perform his/her own work such as preparation of a specimen, and can recognize the end of the preliminary loading based on the display or the buzzer, etc.

(Additional Function)

In addition to the above-described configuration, it is more preferable that the following functions are added as apart of the preliminary loading function.

The purpose of the preliminary loading also includes elimination of a difference between a temperature inside the weighing chamber and a temperature outside the weighing chamber. Due to heat generation of the balance, the temperature inside the weighing chamber easily rises. When the door is opened in this state, air flow is generated to eliminate the temperature difference between the inside and the outside of the weighing chamber. Air flow generation generates wind, and it may act as a wind pressure on the weighing pan and adversely affect weighing in some cases. In order to avoid this, a configuration is preferably made in which a temperature inside the weighing chamber S is monitored by the temperature sensor 4 disposed inside the weighing chamber S, and when it is detected that a temperature change inside the weighing chamber S is a predetermined value or more, Steps S2 to S8 are automatically performed. By performing preliminary loading to automatically eliminate the temperature difference between the inside and the outside of the weighing chamber S, adverse effects on weighing of the temperature difference between the inside and the outside of the weighing chamber S can be prevented.

The timer 7 is configured to be reset according to a last automatic opening or closing operation of the door 11 by the opening and closing mechanism 60, and start counting again.

First, the timer 7 measures an elapsed time from the last closing operation of the door 11 by the opening and closing mechanism 60. The control unit 34 is preferably configured to perform Steps S2 to S8 when it is detected by the timer 7 that a predetermined period of time has elapsed from closing of the door 11. When the operation to open the door of the windshield is not performed for a predetermined period of time or longer, it is highly possible that a temperature difference has occurred between the inside of the weighing chamber and the outside of the weighing chamber. Therefore, by providing a configuration so as to perform preliminary loading, according to the timer 7, when the predetermined period of time elapses from the last closing operation of the door 11, in order to automatically eliminate the temperature difference between the inside and the outside of the weighing chamber S, adverse effects on weighing of the temperature difference between the inside and the outside of the weighing chamber S can be prevented.

Further, the timer 7 also measures an elapsed time from a last opening operation of the door 11 performed by the opening and closing mechanism 60. When the door 11 is left open, adaptation of various sensors and the load detecting unit 3 to the surrounding environment is lost, and this adversely affects weighing. In order to avoid this, the control unit 34 is preferably configured to perform Steps S2 to S8 when an elapse of a predetermined period of time from opening of the door 11 is detected by the timer 7. In this case, the elapsed time may be measured by another timer.

The electronic balance 1 includes two left and right doors 11, and the doors are configured to be independently automatically opened and closed by the opening and closing mechanisms 60. Concerning operations of the doors 11 in Steps S2 to S8 relating to the operation of preliminary loading, it is preferable that only one door 11 is opened and closed. When the plurality of doors provided for the weighing chamber are concurrently opened or closed, wind blows through the inside of the weighing chamber and generates air flow, and the air flow inside the weighing chamber does not become stable even after the doors are closed, and this adversely affects weighing. In order to avoid this, it is preferable to open and close only one of the doors 11 in preliminary loading.

Here, when preliminary loading is started in response to an input with the push switch 39 by a user, it is preferable that when opening and closing the door 11, a door 11 that was opened or closed last by the opening and closing mechanism 60 is opened or closed. Preliminary loading simulating user's action can be performed, and the environment can be made closer to an actual weighing environment. At this time, the other door 11 that is not going to be opened or closed is locked by closing the first one-way solenoid valve 66A and the second one-way solenoid valve 66B, and accordingly, this door can be prevented from being erroneously activated by the user, which is more preferable.

On the other hand, when preliminary loading is started regardless of a user's intention by being triggered by, for example, detection by the timer 7 or the temperature sensor 4 other than an input with the push switch 39, as a door 11 to be opened or closed, the door 11 opposite to the door 11 opened or closed last by the opening and closing mechanism 60 is preferably opened or closed. For example, when a user opens and closes the right door 11 and weighs a specimen, in a case where the temperature sensor 4 detects that a temperature difference between the inside and the outside of the weighing chamber S has reached a predetermined value or more, and preliminary loading is automatically started, the door to be opened or closed in Steps S2 to S7 is the left door 11. This is because, when preliminary loading is automatically started, the user may not recognize that preliminary loading is being performed. When preliminary loading is automatically started, by performing preliminary loading by opening and closing a door 11 opposite to the door 11 that the user had used, the user can be prevented from opening the door by mistake during preliminary loading. At this time, by closing the first one-way solenoid valve 66A and the second one-way solenoid valve 66B, the door 11 that is not going to be opened or closed is locked, and accordingly, erroneous activation can be prevented, which preferable. Further, a configuration in which the start of preliminary loading is automatically informed by a sound or display, is more preferable.

By performing Steps S2 to S8 relating to preliminary loading not only once but multiple times (two or three times), the load detecting unit 3 can be further adapted to the surrounding environment, which is preferable. The series of operations take time, so that it is more preferable that a user can set the number of times to perform the steps.

Further, it is also preferable that, after a predetermined period of time elapses from turning on of the power supply of the electronic balance 1, Steps S2 to S8 are automatically performed as the preliminary loading function. By automatically performing preliminary loading, a user can be prevented from forgetting to push the push switch 39. In this case, in Step S2, the left and right doors 11 are preferably configured so that both of the doors are opened and closed one after another. This is because by opening and closing both doors 11, the operation of the opening and closing mechanisms 60 can be checked, and operations of various sensors can be checked.

Further, in the present embodiment, the electronic balance 1 includes the opening and closing mechanisms 60 to automatically open and close the doors 11 of the windshield 10, and along with opening and closing of the doors 11, the built-in weight 75 is moved up and down by the moving up/down mechanism 70. Without limitation to this, for improvement in weighing accuracy, the preliminary operation is also preferably performed in a case where the electronic balance includes a windshield without the opening and closing mechanisms 60 or in a case where the windshield 10 is not provided. For example, it is known that a weighed value as a final result slightly comes to deviate according to a room temperature change or a change in the degree of adaptation of the weighing mechanism and various sensors to the surrounding environment. Therefore, even in a case where the electronic balance includes only the balance main body 30 without the windshield 10 or in a case where the doors of the windshield are manually opened and closed, it is preferable to stabilize the weighing accuracy by performing zero-point adjustment by moving up/down the built-in weight by the moving up/down mechanism 70 by being triggered by detection of an elapse of the predetermined period of time by the timer 7 or detection of a temperature change equal to or more than a predetermined value by the temperature sensor 4.

Preferred embodiments and additional functions of the present invention have been described above, and these can be modified based on knowledge of a person skilled in the art, and such a modified embodiment is included in the scope of the present invention.

REFERENCE SIGNS LIST

1: Electronic Balance
3: Load detecting unit
4: Temperature sensor
7: Timer
10: Windshield
11: Door
30: Balance main body
31: Weighing pan
34: Control unit
60: Opening and closing mechanism
70: Moving up/down mechanism
75: Built-in weight
S: Weighing chamber

The invention claimed is:

1. An electronic balance comprising:

a weighing pan on which a specimen is placed;

a weighing mechanism joined to the weighing pan;

a windshield including a weighing chamber covering the weighing pan;

an opening and closing mechanism configured to automatically open and close a door constituting a portion of a wall of the weighing chamber;

a moving up/down mechanism for a built-in weight configured to automatically apply and remove the load of the built-in weight to and from the weighing mechanism; and a control unit configured to control the opening and closing mechanism and the moving up/down mechanism, and calculate a weighed value from a measurement value obtained by the weighing mechanism, and the electronic balance being configured to perform the following series of operations (I) to (VII) in sequence according to a command from the control unit:

(I) the opening and closing mechanism opens the door, (II) with the door open, the moving up/down mechanism applies the load of the built-in weight to the weighing mechanism, (III) the opening and closing mechanism closes the door, (IV) after a predetermined period of time elapses, the opening and closing mechanism opens the door, (V) the moving up/down mechanism removes the load of the built-in weight from the weighing mechanism, (VI) the opening and closing mechanism closes the door, and (VII) the control unit performs zero-point adjustment of the weighed value.

2. The electronic balance according to claim 1, comprising:

a temperature sensor configured to measure a temperature inside the weighing chamber, wherein when the temperature sensor detects that a temperature change in the weighing chamber has reached a predetermined value or more, the series of operations (I) to (VII) are performed by the control unit.

3. The electronic balance according to claim 2, comprising:

a timer configured to measure an elapsed time from a last opening/closing operation of the door performed by the opening and closing mechanism, wherein as the timer counts a predetermined period of time or longer, the series of operations (I) to (VII) are performed by the control unit.

4. The electronic balance according to any of claim 3, wherein a plurality of the doors each constituting a portion of a wall of the weighing chamber, are provided, the opening and closing mechanism is configured to be capable of automatically opening and closing at least two or more of the plurality of doors separately, and when the control unit performs the series of operations (I) to (VII), the control unit causes the opening and closing mechanism to open and close the door other than the door that was opened or closed last.

5. The electronic balance according to any of claim 2, wherein a plurality of the doors each constituting a portion of a wall of the weighing chamber, are provided, the opening and closing mechanism is configured to be capable of automatically opening and closing at least two or more of the plurality of doors separately, and when the control unit performs the series of operations (I) to (VII), the control unit causes the opening and closing mechanism to open and close the door other than the door that was opened or closed last.

6. The electronic balance according to claim 1, comprising:

a timer configured to measure an elapsed time from a last opening/closing operation of the door performed by the opening and closing mechanism, wherein as the timer counts a predetermined period of time or longer, the series of operations (I) to (VII) are performed by the control unit.

7. The electronic balance according to any of claim 6, wherein a plurality of the doors each constituting a portion of a wall of the weighing chamber, are provided, the opening and closing mechanism is configured to be capable of automatically opening and closing at least two or more of the plurality of doors separately, and when the control unit performs the series of operations (I) to (VII), the control unit causes the opening and closing mechanism to open and close the door other than the door that was opened or closed last.

8. The electronic balance according to any of claim 1, wherein a plurality of the doors each constituting a portion of a wall of the weighing chamber, are provided, the opening and closing mechanism is configured to be capable of automatically opening and closing at least two or more of the plurality of doors separately, and when the control unit performs the series of operations (I) to (VII), the control unit causes the opening and closing mechanism to open and close the door other than the door that was opened or closed last.

9. The electronic balance according to claim 1, wherein steps (I)-(VII) function as a preliminary loading operation that adjusts the zero-point of the weighing mechanism to the environment by equalizing the temperature.

10. A method for stabilizing weighing accuracy by an electronic balance comprising a weighing pan on which a specimen is placed, a weighing mechanism joined to the weighing pan, a windshield including a weighing chamber covering the weighing pan, an opening and closing mechanism configured to automatically open and close a door constituting a portion of a wall of the weighing chamber, a moving up/down mechanism configured to automatically apply and remove the load of the built-in weight to and from the weighing mechanism, and a control unit configured to control the opening and closing mechanism and the moving up/down mechanism, and calculate a weighed value from a measurement value obtained by the weighing mechanism, comprising:

a first step in which the opening and closing mechanism opens the door;

a second step in which following the first step, the moving up/down mechanism applies the load of the built-in weight to the weighing mechanism;

a third step in which following the second step, the opening and closing mechanism closes the door;

a fourth step in which following the third step, the opening and closing mechanism opens the door after a predetermined period of time elapses;

a fifth step in which following the fourth step, the moving up/down mechanism removes the load of the built-in weight from the weighing mechanism;

a sixth step in which following the fifth step, the opening and closing mechanism closes the door; and a seventh step in which following the sixth step, the control unit performs zero-point adjustment of the weighed value.

11. The method for stabilizing weighing accuracy by an electronic balance according to claim 10, wherein the first through the seventh steps function as a preliminary loading operation that adjusts the zero-point of the weighing mechanism to the environment by equalizing the temperature.

* * * * *